United States Patent
Zhang

(10) Patent No.: US 12,481,295 B2
(45) Date of Patent: Nov. 25, 2025

(54) INTELLIGENT MOBILE DEVICE AND CONTROL METHOD THEREFOR, AND ELECTRONIC DEVICE AND STORAGE MEDIUM

(71) Applicant: Beijing Roborock Technology Co., Ltd., Beijing (CN)

(72) Inventor: Lei Zhang, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 22 days.

(21) Appl. No.: 18/559,173

(22) PCT Filed: Mar. 7, 2022

(86) PCT No.: PCT/CN2022/079586
§ 371 (c)(1),
(2) Date: Nov. 6, 2023

(87) PCT Pub. No.: WO2022/233182
PCT Pub. Date: Nov. 10, 2022

(65) Prior Publication Data
US 2024/0231382 A1   Jul. 11, 2024

(30) Foreign Application Priority Data
May 6, 2021  (CN) .......................... 202110491513.7

(51) Int. Cl.
*G05D 1/639* (2024.01)
*G05D 1/648* (2024.01)
(Continued)

(52) U.S. Cl.
CPC .......... *G05D 1/639* (2024.01); *G05D 1/6485* (2024.01); *G05D 2105/10* (2024.01); *G05D 2107/40* (2024.01)

(58) Field of Classification Search
CPC .... G05D 1/639; G05D 1/6485; G05D 1/0219; G05D 1/0276; G05D 2105/10; G05D 2107/40; G05D 2109/10
See application file for complete search history.

(56) References Cited

U.S. PATENT DOCUMENTS

2012/0125363 A1* 5/2012 Kim ...................... A47L 9/2852
134/6
2019/0298134 A1 10/2019 Takaoka et al.
(Continued)

FOREIGN PATENT DOCUMENTS

CN   108693880 A   10/2018
CN   109765898 A   5/2019
(Continued)

OTHER PUBLICATIONS

First Office Action for CN Patent Application No. 202110491513.7.
(Continued)

*Primary Examiner* — Michael J Zanelli
(74) *Attorney, Agent, or Firm* — Perilla Knox & Hildebrandt LLP; Kenneth A. Knox

(57) ABSTRACT

An intelligent mobile device and a control method therefore are described. The method includes: acquiring, when the intelligent mobile apparatus is trap, first ground medium attribute information of a trapping region, where the first ground medium attribute information includes ground medium attribute information of the trapping region; and controlling, if the first ground medium attribute information matches target ground medium attribute information, the intelligent mobile apparatus to leave the trapping region and re-enter the trapping region in a direction different from a direction in which the intelligent mobile apparatus enters the trapping region.

17 Claims, 5 Drawing Sheets

(51) Int. Cl.
*G05D 105/10* (2024.01)
*G05D 107/40* (2024.01)

(56) References Cited

U.S. PATENT DOCUMENTS

| | | | | |
|---|---|---|---|---|
| 2019/0365176 | A1* | 12/2019 | Kim | ..................... B25J 11/0085 |
| 2021/0064055 | A1* | 3/2021 | Jun | ........................ B25J 9/1666 |
| 2021/0096560 | A1 | 4/2021 | Al-Mohssen et al. | |
| 2023/0200613 | A1* | 6/2023 | Niu | ..................... A47L 11/4011 701/301 |

FOREIGN PATENT DOCUMENTS

| | | | |
|---|---|---|---|
| CN | 109875470 A | 6/2019 | |
| CN | 110338708 A | 10/2019 | |
| CN | 110522352 A | 12/2019 | |
| CN | 111166240 A | 5/2020 | |
| CN | 111197987 A | 5/2020 | |
| CN | 111481113 A | 8/2020 | |
| CN | 111700543 A | 9/2020 | |
| CN | 111714030 A | 9/2020 | |
| CN | 111796290 A | 10/2020 | |
| CN | 111802968 A | 10/2020 | |
| CN | 112205937 A | 1/2021 | |
| CN | 113940590 A * | 1/2022 | |
| CN | 113974507 A * | 1/2022 | .......... A47L 11/4002 |
| JP | 2021018485 A | 2/2021 | |
| WO | 2012147669 A1 | 11/2012 | |
| WO | 2020017236 A1 | 1/2020 | |
| WO | 2020253803 A1 | 12/2020 | |
| WO | WO-2021043287 A1 * | 3/2021 | .............. A47L 11/24 |

OTHER PUBLICATIONS

International Search Report for International Application No. PCT/CN2022/079586 of May 17, 2022.
Extended European Search Report for EP Patent Application No. 22798524.9 of Apr. 10, 2025.
Notice of Allowance for CN Patent Application No. 202110491513.7 of Jun. 2, 2025.

* cited by examiner

INTELLIGENT MOBILE DEVICE AND CONTROL METHOD THEREFOR, AND ELECTRONIC DEVICE AND STORAGE MEDIUM

CROSS-REFERENCE TO RELATED APPLICATIONS

This application is a national phase application under 35 U.S.C. § 371 of PCT/CN2022/079586 filed Mar. 7, 2022, which claims the benefit of and priority to Chinese Patent Application No. 202110491513.7 filed on May 6, 2021, the contents of both of which being incorporated by reference in their entireties herein as a part of the present application.

TECHNICAL FIELD

The present disclosure relates to the field of intelligent control technologies and, in particular, to an intelligent mobile apparatus and a method for controlling the same, an electronic device, and a storage medium.

BACKGROUND

With the rising of living standards and the development of technologies, intelligent mobile apparatuses, such as cleaning robots, have been widely applied. During working operations, the intelligent mobile apparatuses usually need to travel on different types of ground surfaces, such as hard floors or carpets. However, when traveling from one type of ground medium to another type of ground medium, the intelligent mobile apparatuses get trapped easily and are thus unable to move and complete a work task, often due to differences in the type of ground medium and the relative height difference between two types of mediums.

It should be noted that the information disclosed in the Background section is merely for strengthening the understanding of the background of the present disclosure, and may therefore include information that does not constitute the prior art known to those of ordinary skills in the art.

BRIEF SUMMARY

A series of concepts in a simplified form are introduced in the Brief Summary section, and will be further explained in details in the Detailed Description section. The Brief Summary section of the present disclosure is not intended to define the essential features and the necessary technical features of the claimed technical solutions, and even not intended to determine the scope of protection of the claimed technical solutions.

In a first aspect, an embodiment of the present disclosure provides a method for controlling an intelligent mobile apparatus. The method includes:

acquiring, when the intelligent mobile apparatus is trapped, first ground medium attribute information of a trapping region, where the first ground medium attribute information includes ground medium attribute information of the trapping region; and controlling, if the first ground medium attribute information matches target ground medium attribute information, the intelligent mobile apparatus to leave the trapping region and re-enter the trapping region in a direction different from a direction in which the intelligent mobile apparatus enters the trapping region.

Optionally, the re-entering the trapping region in the direction different from the direction in which the intelligent mobile apparatus enters the trapping region includes:

determining a target advancing direction and a target advancing distance of the intelligent mobile apparatus, where the target advancing direction is a direction that is different from the direction in which the intelligent mobile apparatus enters the trapping region and that points to the trapping region, and the target advancing distance is a distance in the target advancing direction between the intelligent mobile apparatus after escape and an edge of the trapping region; and controlling, based on the target advancing distance, the intelligent mobile apparatus to move along the target advancing direction, such that the intelligent mobile apparatus re-enters the trapping region.

Optionally, the controlling, based on the target advancing distance, the intelligent mobile apparatus to move along the target advancing direction, such that the intelligent mobile apparatus re-enters the trapping region, includes:

controlling the intelligent mobile apparatus to travel along the target advancing direction by taking a position where the intelligent mobile apparatus escapes successfully as a starting point;

acquiring a first real-time distance traveled by the intelligent mobile apparatus in the target advancing direction and second ground medium attribute information, where the second ground medium attribute information includes ground medium attribute information detected by the intelligent mobile apparatus in the target advancing direction; and determining that the intelligent mobile apparatus has re-entered the trapping region, if the first real-time distance is greater than or equal to the target advancing distance and the second ground medium attribute information matches the target ground medium attribute information.

Optionally, the determining the target advancing direction and the target advancing distance of the intelligent mobile apparatus includes:

acquiring the target advancing direction of the intelligent mobile apparatus by taking a position where the intelligent mobile apparatus escapes successfully as a starting point and deflecting the intelligent mobile apparatus clockwise or counterclockwise by a preset angle;

acquiring a reference distance, which reference distance is a movement distance of the intelligent mobile apparatus from a trapping position to the position where the intelligent mobile apparatus escapes successfully; and acquiring, based on the angle and the reference distance, the target advancing distance of the intelligent mobile apparatus.

Optionally, the preset angle is not less than 30°.

Optionally, the controlling the intelligent mobile apparatus to leave the trapping region specifically includes:

acquiring a preset retreating direction, which preset retreating direction is opposite to the direction in which the intelligent mobile apparatus enters the trapping region; and controlling the intelligent mobile apparatus to leave the trapping region along the preset retreating direction.

Optionally, the method further includes: confirming that the intelligent mobile apparatus has left the trapping region, which specifically includes:

acquiring a second real-time distance traveled by the intelligent mobile apparatus along the preset retreating direction; and determining that the intelligent mobile apparatus has left the trapping region, if the second real-time distance is greater than or equal to the preset retreating distance.

Optionally, the method further includes: confirming that the intelligent mobile apparatus has left the trapping region, which specifically includes:

determining that the intelligent mobile apparatus has left the trapping region, when current ground medium attribute information does not match the target ground medium attribute information.

Optionally, after re-entering the trapping region in the direction different from the direction in which the intelligent mobile apparatus enters the trapping region, the method further includes:

controlling, after the intelligent mobile apparatus has traveled out of the trapping region, the intelligent mobile apparatus to continue traveling along the direction in which the intelligent mobile apparatus enters the trapping region.

In a second aspect, an embodiment of the present disclosure provides an intelligent mobile apparatus, including an environmental monitoring sensor and a controller.

The environmental monitoring sensor is configured to monitor ground medium attributes during movement of the intelligent mobile apparatus to acquire first ground medium attribute information, second ground medium attribute information, or current ground medium attribute information. The first ground medium attribute information includes ground medium attribute information of a trapping region, and the second ground medium attribute information includes ground medium attribute information detected in a target advancing direction. The target advancing direction is different from a direction in which the intelligent mobile apparatus enters the trapping region and points to the trapping region.

The controller is configured to perform the method for controlling the intelligent mobile apparatus described above.

In a third aspect, an embodiment of the present disclosure provides an electronic device, including a processor and a memory. The memory is configured to store at least one executable instruction, which causes the processor to perform the method for controlling the intelligent mobile apparatus described above.

In a fourth aspect, an embodiment of the present application provides a storage medium storing a computer program instruction. When the computer program instruction is invoked and executed by a processor, the steps of the method for controlling the intelligent mobile apparatus described above are implemented.

According to the intelligent mobile apparatus and the method for controlling the same, the electronic device, and the storage medium provided by the embodiments of the present disclosure, in the case of different types of ground mediums and a relative height difference between two types of mediums, the risk that the intelligent mobile apparatus is trapped again when entering the trapping region is reduced, allowing the intelligent mobile apparatus to move normally in the trapping region for completing a job task.

BRIEF DESCRIPTION OF THE DRAWINGS

The following accompanying drawings of the present disclosure, as part of the embodiments of the present disclosure here, are used for understanding the present disclosure.

The accompanying drawings show the embodiments of the present disclosure and the descriptions thereof to explain the principles of the present disclosure.

In the accompanying drawings:

FIG. 1 is a schematic structural diagram of a distance measurement sensor of a cleaning robot according to an alternative embodiment of the present disclosure:

FIG. 2 is a schematic stereoscopic diagram of a cleaning robot according to an alternative embodiment of the present disclosure;

FIG. 3 is a flowchart of a method for controlling an intelligent mobile apparatus according to an alternative embodiment of the present disclosure:

FIG. 4 is a flowchart of step S302;

FIG. 5 is a schematic diagram of a travel route of an intelligent mobile apparatus according to an alternative embodiment of the present disclosure;

FIG. 6 is a flowchart of step S401;

FIG. 7 is a schematic diagram of the principle for calculating a target advancing direction according to an alternative embodiment of the present disclosure;

FIG. 8 is a flowchart of step S402;

FIG. 9 is a flowchart of controlling an intelligent mobile apparatus to leave a trapping region in step S302 according to an alternative embodiment of the present disclosure; and FIG. 10 is a flowchart of confirming that an intelligent mobile apparatus has left a trapping region according to an alternative embodiment of the present disclosure.

DETAILED DESCRIPTION

In the following description, a large number of specific details are given for a more thorough understanding of the present disclosure. However, it is readily apparent for those skilled in the art that the present disclosure can be implemented without one or more of these details. In other examples, in order to avoid confusion with the present disclosure, some technical features known in the art are not described.

It should be noted that the terms used herein are only intended to describe specific embodiments rather than to limit the exemplary embodiments according to the present disclosure. As used herein, the singular form is also intended to include the plural form, unless otherwise expressly stated in the context. Furthermore, it should also be understood that, when the terms "contain" and/or "include" are used in the description, they indicate the presence of the stated features, entireties, steps, operations, elements and/or assemblies, but do not exclude the presence or addition of one or more other features, entireties, steps, operations, elements, assemblies, and/or their combinations.

The exemplary embodiments according to the present disclosure will now be described in more details with reference to the accompanying drawings. However, these exemplary embodiments may be implemented in a variety of different forms and should not be interpreted as being limited to the embodiments set forth here. It should be understood that these embodiments are provided in order to make the disclosure of the present disclosure thorough and complete, and to fully convey the concepts of these exemplary embodiments to those of ordinary skills in the art.

A method for controlling an intelligent mobile apparatus provided in the present application is applicable to intelligent mobile apparatuses. In order to clearly describe the method for controlling the intelligent mobile apparatus in the present disclosure, in the following, elaborations are provided firstly on the intelligent mobile apparatus provided in the second aspect of the present disclosure.

Figure 1:
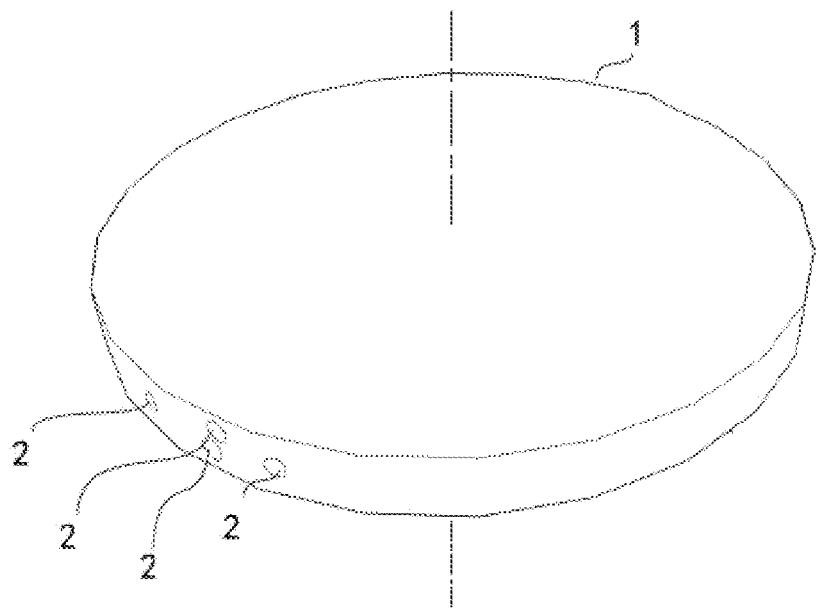
Figure 2:
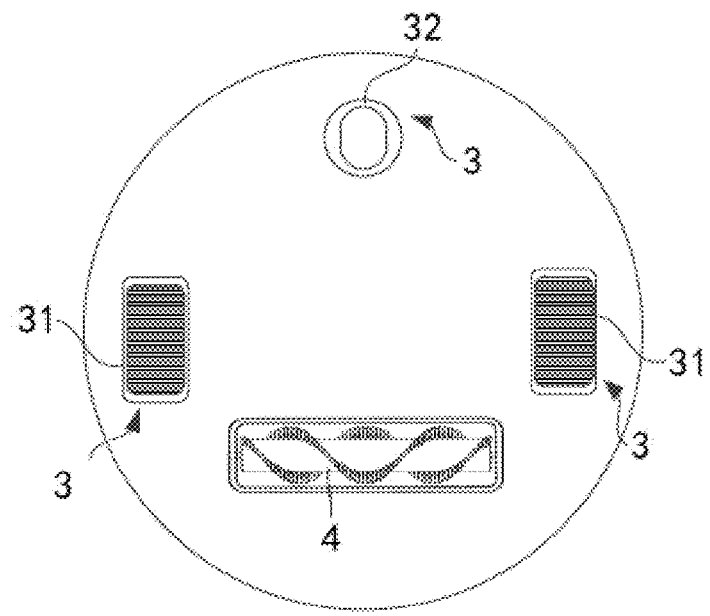

As shown in FIGS. 1 and 2, an intelligent mobile apparatus 1 includes, but is not limited to, an environmental monitoring sensor 2, a traveling assembly 3, and a controller.

The traveling assembly 3 is a component related to the movement of the intelligent mobile apparatus 1, and includes driving wheels 31 and a universal wheel 32. The universal wheel 32 cooperates with the driving wheels 31 to achieve turning and movement of the intelligent mobile apparatus 1. One driving wheel 31 is disposed on each of the left and right sides at the bottom of the intelligent mobile apparatus 1. The universal wheel 32 is disposed on a center line of a bottom surface of the intelligent mobile apparatus 1. Each driving wheel 31 is provided with a driving wheel motor, and rotates under the driving by the driving wheel motor. After the driving wheel 31 rotates, the intelligent mobile apparatus 1 is driven to move. A turning angle of the intelligent mobile apparatus 1 may be controlled by controlling a rotating speed difference between the left and right driving wheels 31.

The controller may include, but is not limited to, a central processing unit (CPU) and a control circuit or the like.

The environmental monitoring sensor 2 may include, but is not limited to, a vision sensor, a laser sensor, an ultrasonic sensor, an infrared sensor, a camera, a depth camera, or the like, or potentially a combination thereof. The environmental monitoring sensor is configured to detect the type of a ground medium, and is capable of distinguishing the type of the ground medium, and sending a detection result to the controller. By taking a direction in which the intelligent mobile apparatus travels in a normal operation status as a forward direction, the environmental monitoring sensor 2 is usually disposed at a front or bottom end of the intelligent mobile apparatus, such that the ground medium at a forward or current position may be known in time.

Further, the intelligent mobile apparatus is further provided with a communication unit for wired or wireless communication with an external apparatus. The communication unit may access a wireless network based on a communication standard, such as WiFi, 2G, 3G, 4G, or 5G, or a combination thereof. In an exemplary embodiment, the communication unit receives broadcast signals or broadcast-associated information from an external broadcast management system via a broadcast channel. In an exemplary embodiment, the communication unit further includes a near field communication (NFC) module for facilitating short-range communication. For example, the NFC module may be implemented based on a radio frequency identification (RFID) technology, an infrared data association (IrDA) technology, an ultra-wideband (UWB) technology, a Bluetooth (BT) technology, and other technologies.

The intelligent mobile apparatus in an exemplary embodiment of the present disclosure may be a cleaning robot, and thus may further include a cleaning assembly as an example.

The cleaning assembly may include, but is not limited to, a mopping member, a sweeping member 4, a spraying member, or the like. The mopping member is configured to mop and clean a region to be cleaned. The number of the mopping member may be one or more. A mop cloth in the mopping member may be made of a cotton cloth, a fiber cloth, or the like. The mopping member is disposed at the bottom of a body of the cleaning robot.

The sweeping member 4 may at least include a rolling brush structure and a dust suction structure. The rolling brush structure may include a rotatable roller and brush teeth disposed on the rotatable roller. The rotatable roller is disposed inside the body of the cleaning robot. A dust suction port is disposed in a lower portion of the body of the cleaning robot. Also, the brush teeth protrude from the dust suction port to contact the region to be cleaned. In practical applications, a driving motor is configured to drive the rotatable roller and the brush teeth thereon to rotate for performing the cleaning operation, thereby sucking in garbage and delivering the garbage into the dust suction structure by means of a collection inlet. The dust suction structure may include a dust collection box, a dust suction fan, and a corresponding channel. The dust suction fan has an air inlet and an air outlet. The air inlet of the dust suction fan is in communication with the dust collection box by means of an air inlet channel. The air outlet of the dust suction fan is in communication with an exhaust channel. In practical applications, a fan motor in the dust suction fan drives a fan to rotate, such that an air flow containing garbage enters the dust collection box, the garbage in the air flow is filtered by a filter screen in the dust collection box and stored in the dust collection box, and the filtered air flow is discharged out of the cleaning robot from the air outlet of the dust suction fan via the exhaust channel.

By taking the intelligent mobile apparatus being the cleaning robot as an example, when traveling from a hard floor to a medium-and-long-pile carpet, the cleaning robot may easily push up the edge of the carpet, skid when getting on the carpet, or undergo increased resistance when getting on the carpet, if the posture and action of the cleaning robot when getting on the carpet are inappropriate. This is because that the thickness of the medium-and-long-pile carpet is equivalent to the size of a gap from a front bumper of the cleaning robot to the ground and the medium-and-long-pile carpe is even higher than the front bumper. As a result, the cleaning robot is trapped by the carpet and unable to clean the carpet.

The following provides a detailed description of the method for controlling the cleaning robot according to a first aspect of the present disclosure.

Figure 3:
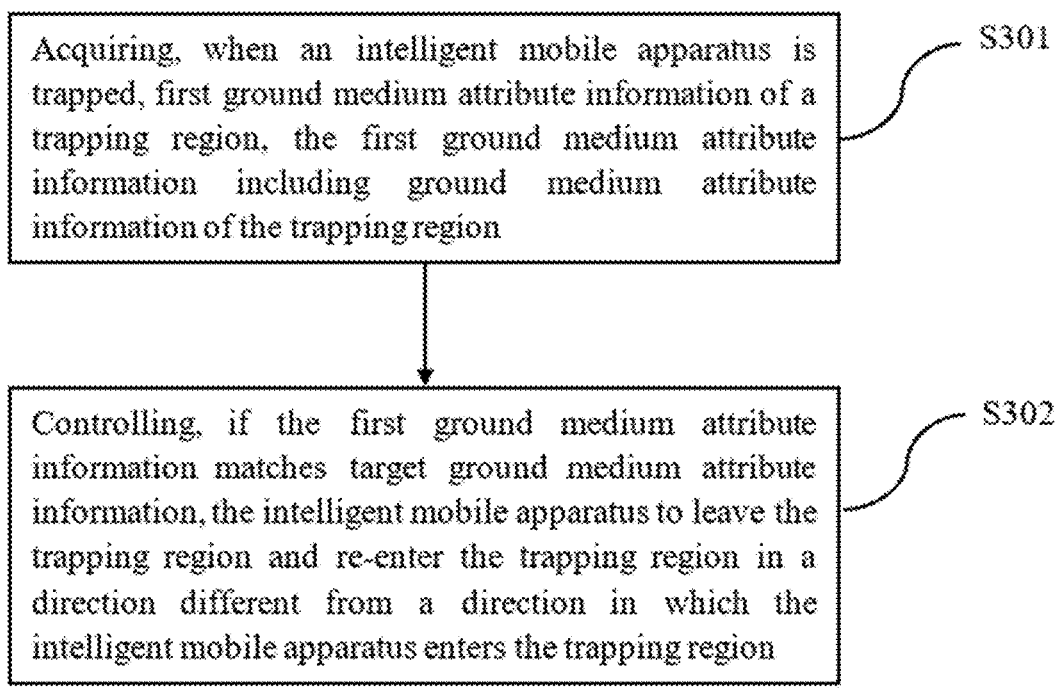

As shown in FIG. 3, in a first aspect, embodiments of the present disclosure provide a method for controlling an intelligent mobile apparatus. The method includes the following steps.

In step S301, when the intelligent mobile apparatus is trapped, first ground medium attribute information of a trapping region is acquired. The first ground medium attribute information includes ground medium attribute information of the trapping region.

Due to the complex working environment, the intelligent mobile apparatus may be trapped in some regions, and whether the intelligent mobile apparatus is trapped may be determined based on the following criteria; skid of the driving wheel of the intelligent mobile apparatus, overcurrent, incapability of continuing advancing, or the like.

The first ground medium attribute information may be detected by an environmental monitoring sensor disposed on the intelligent mobile apparatus. As an example, a vision sensor is used as the environmental monitoring sensor. A ground medium image in a preset advancing direction of the intelligent mobile apparatus is taken by the vision sensor, and the ground medium image is processed by using a preset identification algorithm and ground medium model characteristics, thereby acquiring the relevant parameters related to a ground medium, i.e., the first ground medium attribute information. In another embodiment, an ultrasonic sensor is used as the environmental monitoring sensor. The ultrasonic sensor is usually disposed at a position that is at the bottom of the intelligent mobile apparatus and close to a traveling direction of the intelligent mobile apparatus. The medium attribute information of a ground where the intelligent mobile apparatus is located currently can be detected by means of the ultrasonic principle. The ground medium model characteristics described above include but are not limited to the color, pattern, or the like of the ground medium.

In step S302, if the first ground medium attribute information matches target ground medium attribute information, the intelligent mobile apparatus is controlled to leave the trapping region and re-enter the trapping region in a direction different from a direction in which the intelligent mobile apparatus enters the trapping region.

The target ground medium attribute information may be, among different ground medium attribute information, the attribute information of a ground medium that is prone to trapping. For example, on a partially-carpeted hard floor, the intelligent mobile apparatus is easily trapped when traveling from the hard floor to the carpet. Hence, the target ground medium attribute information is carpet information.

Matching is performed between the first ground medium attribute information and the target ground medium attribute information. If the first ground medium attribute information successfully matches the target ground medium attribute information, it can be determined that the first ground medium attribute information is the target ground medium attribute information, and thus it can be determined that the ground medium attribute information changes. That is, the intelligent mobile apparatus is at a junction between two different ground mediums. Accordingly, it can be determined that the intelligent mobile apparatus is trapped due to the change in ground medium. For example, a region where the intelligent mobile apparatus operates is a partially-carpeted hard floor, and the target ground medium attribute information is the carpet information. When the intelligent mobile apparatus is trapped and the acquired first ground medium attribute information matches the carpet information, it can be determined that the intelligent mobile apparatus is trapped during traveling from the hard floor to the carpet, due to the factors that the edge of the carpet is pushed up, skid occurs when getting on the carpet, or resistance increases when getting on the carpet, which factors impede the advancing of the intelligent mobile apparatus. In this case, the intelligent mobile apparatus is controlled to leave the trapping region and re-enter the trapping region in a direction different from a direction in which the intelligent mobile apparatus enters the trapping region, such that the risk that the intelligent mobile apparatus is trapped again when entering the trapping region is reduced, allowing the intelligent mobile apparatus to move normally in the trapping region for completing a work task.

Figure 4:
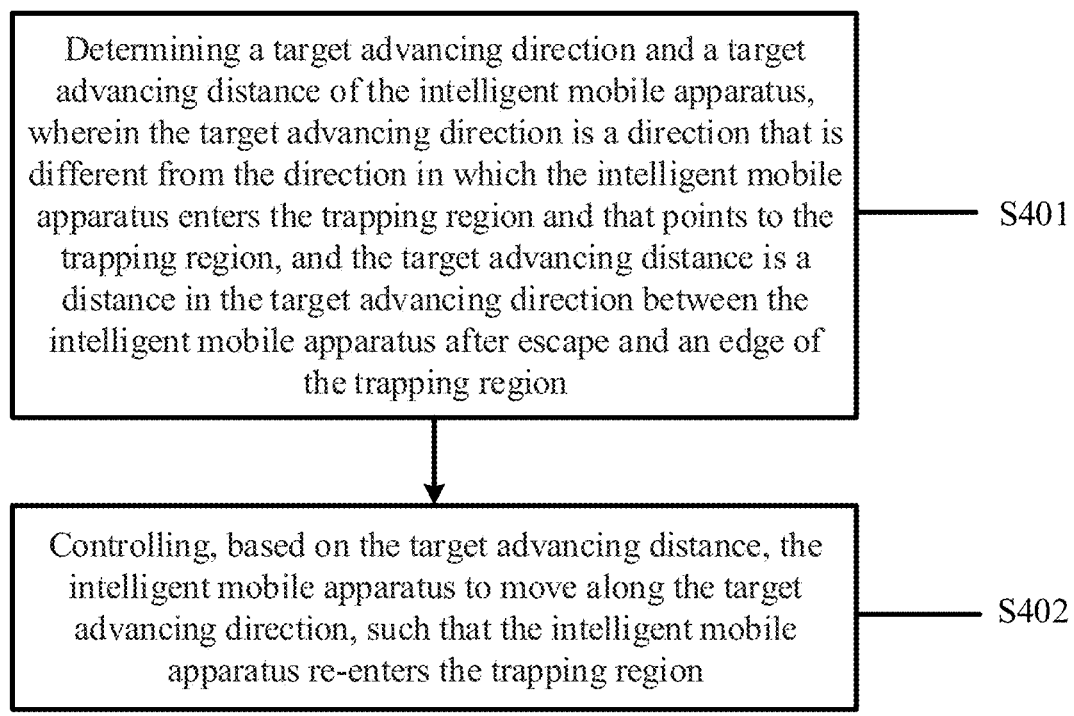

As shown in FIG. 4, according to a specific application, in the above embodiment, step S302 includes the following steps.

In step S401, a target advancing direction and a target advancing distance of the intelligent mobile apparatus are determined. The target advancing direction is a direction that is different from the direction in which the intelligent mobile apparatus enters the trapping region, and the target advancing direction points to the trapping region. The target advancing distance is a distance in the target advancing direction between the intelligent mobile apparatus after escape and an edge of the trapping region.

The target advancing direction is set to the direction that is different from the direction in which the intelligent mobile apparatus enters the trapping region and points to a target region. In this case, the intelligent mobile apparatus is allowed to leave the trapping region and then travel along the target advancing direction to a new ground medium junction, i.e., a position with certain distance from the original ground medium junction, in order to avoid getting trapped repeatedly at the original ground medium junction.

The target advancing distance is set to the distance in the target advancing direction between the intelligent mobile apparatus and the edge of the trapping region, such that the distance traveled by the intelligent mobile apparatus can be reduced, thereby reducing the power consumption of the intelligent mobile apparatus and shortening the travel time.

Figure 5:
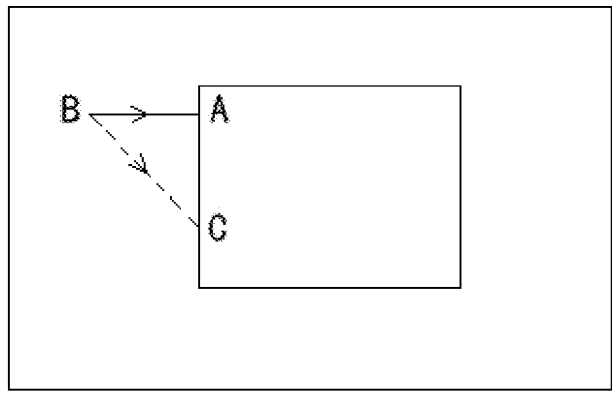

Exemplarily, as shown in FIG. 5, a solid arrow indicates the direction in which the intelligent mobile apparatus enters the trapping region, and a dotted arrow indicates the target advancing direction. During traveling along the direction in which the intelligent mobile apparatus enters the trapping region, the intelligent mobile apparatus is trapped at a ground medium junction A. The point B is a final position from which the intelligent mobile apparatus leaves the trapping region. A new ground medium junction C is determined according to the target advancing direction and the target advancing distance, thereby avoiding the possibility of getting trapped when the intelligent mobile apparatus travels to the ground medium junction A again.

Figure 6:
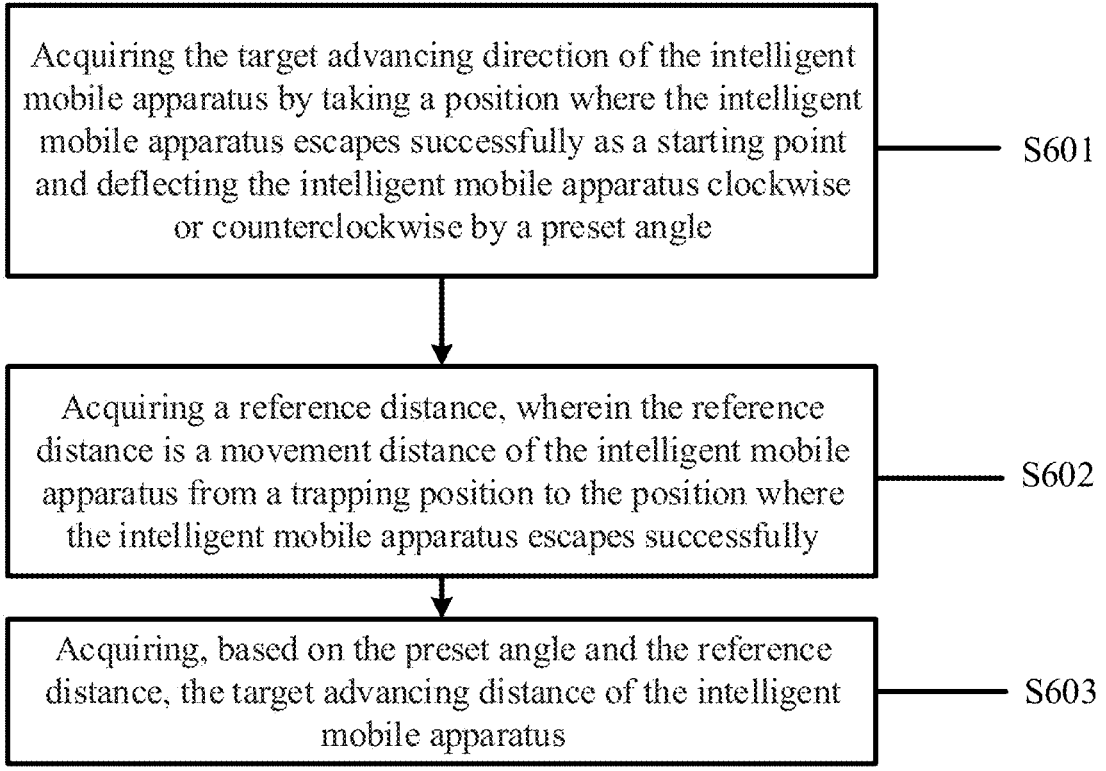

Specifically, as shown in FIG. 6, this step includes the following steps.

In step S601, by taking a position where the intelligent mobile apparatus escapes successfully as a starting point, and deflecting the intelligent mobile apparatus clockwise or counterclockwise by a preset angle, the target advancing direction of the intelligent mobile apparatus is acquired.

The deflection direction and the preset angle may be set by an operator. Further, the preset angle is set to a larger angle, so as to avoid getting trapped repeatedly due to a distance that is too short between the new ground medium junction and the original ground medium junction. Optionally, the preset angle is not less than 30°.

In step S602, a reference distance is acquired. The reference distance is a movement distance of the intelligent mobile apparatus from a trapping position to the position where the intelligent mobile apparatus escapes successfully.

Exemplarily, as shown in FIG. 5, the reference distance is a distance from the point A to the point B.

In step S603, the target advancing distance of the intelligent mobile apparatus is acquired based on the preset angle and the reference distance.

Figure 7:
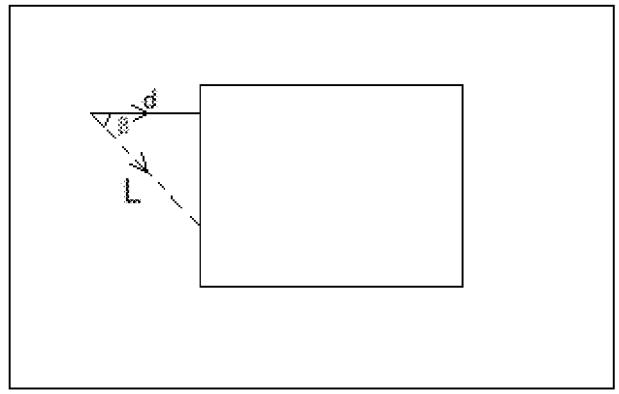

In the case where the intelligent mobile apparatus is a cleaning robot, and the region where the intelligent mobile apparatus works is a partially-carpeted hard floor, the angle between the preset advancing direction and the edge of the carpet is usually 90°. Exemplarily, by taking FIG. 7 as an example, the reference distance d and the preset angle β are given, and the target advancing distance L, i.e., the distance traveled by the intelligent mobile apparatus to the new ground medium junction along the target advancing direction after escape, may be calculated by a trigonometric function.

In step S402, based on the target advancing distance, the intelligent mobile apparatus is controlled to move along the target advancing direction, such that the intelligent mobile apparatus re-enters the trapping region.

The intelligent mobile apparatus is controlled to travel by the target advancing distance along the target advancing direction, such that the intelligent mobile apparatus reaches the new ground medium junction to re-enter the trapping region.

Figure 8:
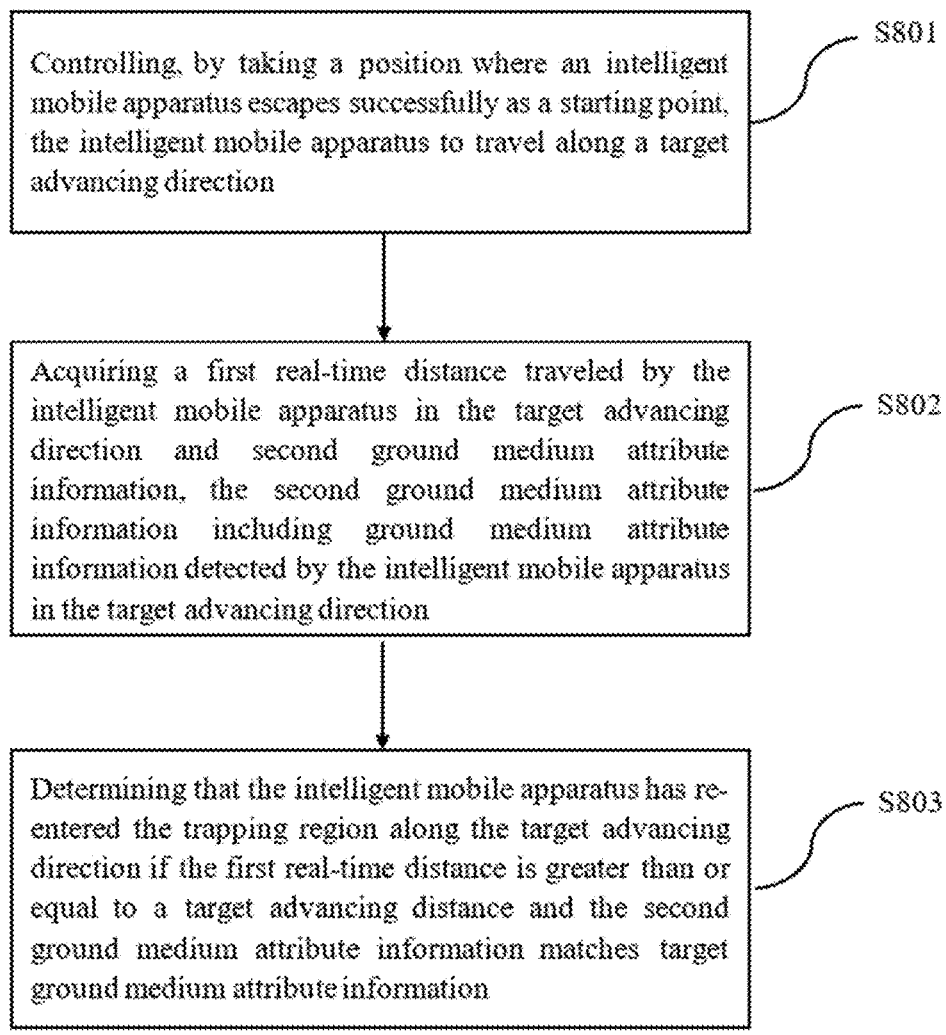

Specifically, as shown in FIG. 8, the control step specifically includes the following steps.

In step S801, by taking a position where the intelligent mobile apparatus escapes successfully as a starting point, the intelligent mobile apparatus is controlled to travel along the target advancing direction.

As shown in FIG. 5, the intelligent mobile apparatus travels in a straight line from the final position B, where the intelligent mobile apparatus escapes successfully, towards the new ground medium junction C along the target advancing direction. The straight-line traveling can shorten the travel distance and time, which not only reduces the power consumption of the intelligent mobile apparatus, but also allows the intelligent mobile apparatus to reach the new ground medium junction as soon as possible.

In step S802, a first real-time distance, which is traveled by the intelligent mobile apparatus in the target advancing direction, and second ground medium attribute information are acquired. The second ground medium attribute information includes ground medium attribute information detected by the intelligent mobile apparatus in the target advancing direction.

In step S803, it is determined that the intelligent mobile apparatus has re-entered the trapping region along the target advancing direction, if the first real-time distance is greater than or equal to the target advancing distance and the second ground medium attribute information matches the target ground medium attribute information.

Whether the intelligent mobile apparatus travels to the trapping region along the target advancing direction is determined by identifying the travel distance and the ground medium attribute information, which can improve the accuracy of determination. As an example, the intelligent mobile apparatus is the cleaning robot, and the region where the intelligent mobile apparatus operates is the partially-carpeted hard floor. It is assumed that the first real-time distance is 0.5 m, the target advancing distance is 0.45 m, and the second ground medium attribute information matches the carpet information. Then, it can be determined that the intelligent mobile apparatus has re-entered the trapping region along the target advancing direction.

Figure 9:
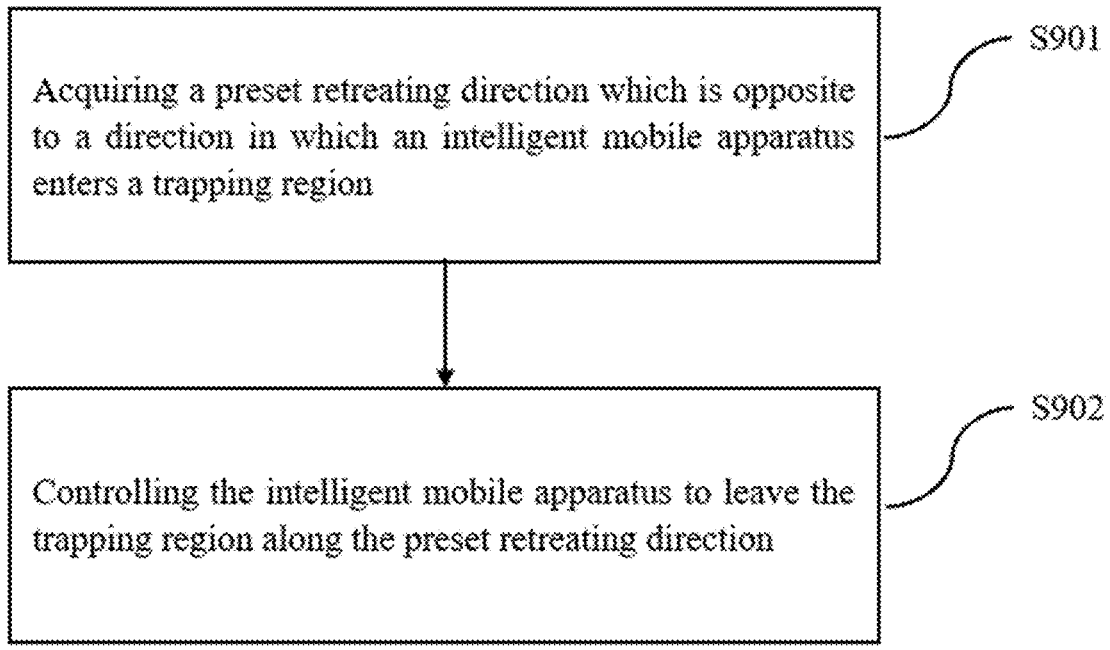

The specific escape process of the intelligent mobile robot is set forth below. In the embodiment described above, as shown in FIG. 9, the controlling the intelligent mobile apparatus to leave the trapping region in step S302 specifically includes the following steps.

In step S901, a preset retreating direction is acquired. The preset retreating direction is opposite to the direction in which the intelligent mobile apparatus enters the trapping region.

The preset retreating direction is in the same line as the direction in which the intelligent mobile apparatus enters the trapping region. For example, if the direction in which the intelligent mobile apparatus pre-enters the trapping region is a forward direction perpendicular to the edge of the trapping region, the preset retreating direction is a backward direction perpendicular to the edge of the trapping region.

In step S902, the intelligent mobile apparatus is controlled to leave the trapping region along the preset retreating direction.

The retreating distance may be preset according to the size of the intelligent mobile apparatus to ensure that, after reaching the preset retreating distance, the intelligent mobile apparatus may completely escape from a trapping point, thereby increasing the success rate in escape. Alternatively, whether the intelligent mobile apparatus has left the tapping region may be determined according to a monitoring result of the environmental monitoring sensor during retreating.

The straight-line retreating can shorten the retreating distance and time, which not only reduces the power consumption of the intelligent mobile apparatus, but also allows the intelligent mobile apparatus to escape as soon as possible.

In some possible implementations, the method further includes the step of determining that the intelligent mobile apparatus has left the trapping region. A variety of implementations may be used to determine that the intelligent mobile apparatus has left the trapping region, and different determination methods will be elaborated below respectively.

Figure 10:
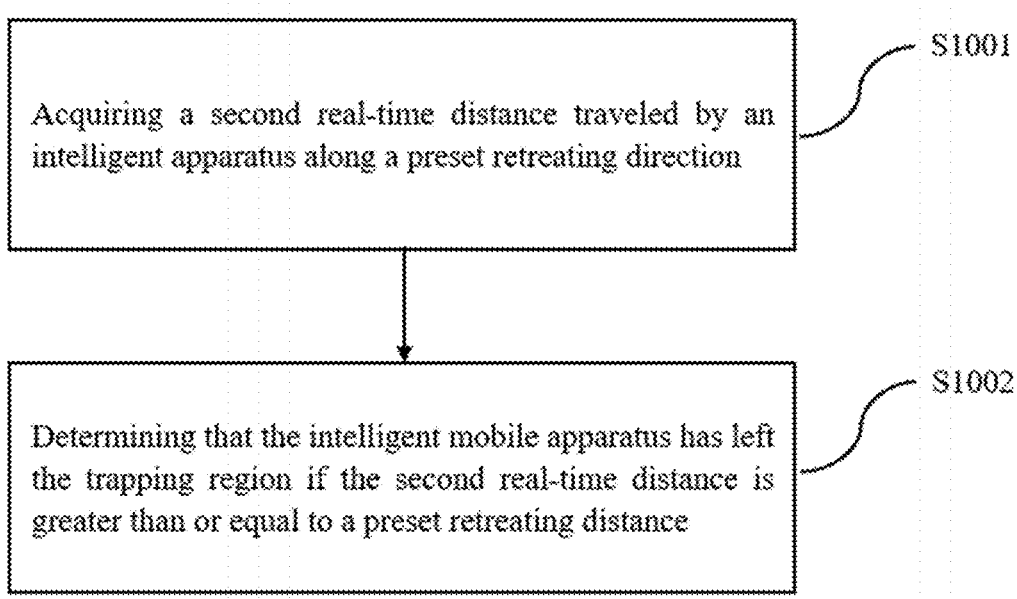

In a first implementation, as shown in FIG. 10, the determining that the intelligent mobile apparatus has left the trapping region specifically includes the following steps.

In step S1001, a second real-time distance traveled by the intelligent mobile apparatus along the preset retreating direction is acquired.

In step S1002, it is determined that the intelligent mobile apparatus has left the trapping region if the second real-time distance is greater than or equal to the preset retreating distance.

Whether the intelligent mobile apparatus has successfully escaped is determined by comparing the real-time retreating distance with the preset retreating distance, which a simple determination method with a low requirement for the controller of the intelligent mobile apparatus and is easy for accomplishment.

Exemplarily, the preset retreating distance is 0.7 m. If the second real-time distance is 0.71 m, it can be determined that the intelligent mobile apparatus has escaped successfully.

In a second implementation, the determining that the intelligent mobile apparatus has left the trapping region specifically includes the following step.

When the current ground medium attribute information does not match the target ground medium attribute information, it is determined that the intelligent mobile apparatus has left the trapping region.

Whether the intelligent mobile apparatus has escaped successfully is determined by identifying the current ground medium attribute information by the environmental monitoring sensor configured on the intelligent mobile apparatus, thereby determining whether the front end of the intelligent mobile apparatus escapes from the trapping point. In this way, it is determined whether the entire intelligent mobile apparatus has escaped. Moreover, as compared with the first implementation, the determination is made by performing matching between the detected medium attribute information and the target ground medium attribute information, thereby improving the accuracy in determination.

In some other possible implementations, after step S302 in the embodiment described above, the method further includes the following step.

In step S303, after the intelligent mobile apparatus has traveled out of the trapping region, the intelligent mobile apparatus is controlled to travel along the direction in which the intelligent mobile apparatus enters the trapping region.

After traveling out of the trapping region, the intelligent mobile apparatus is controlled to adjust the advancing direction into the previous advancing direction in which the intelligent mobile apparatus enters the trapping region, so that the intelligent mobile apparatus travels along a movement direction in which the intelligent mobile apparatus operates normally. Thus, the intelligent mobile apparatus is allowed to continue traveling and operating normally, thereby avoiding omission of some regions.

In a second aspect, an embodiment of the present disclosure provides an intelligent mobile apparatus, which includes an environmental monitoring sensor and a controller. The environmental monitoring sensor is configured to monitor ground medium attributes during movement of the intelligent mobile apparatus for acquiring first ground medium attribute information, second ground medium attribute information, or current ground medium attribute information. The first ground medium attribute information includes ground medium attribute information of a trapping region, and the second ground medium attribute information includes ground medium attribute information detected in a target advancing direction. The target advancing direction is different from a direction in which the intelligent mobile apparatus enters the trapping region, and points to the trapping region. The controller is configured to perform the method for controlling the intelligent mobile apparatus described above.

In a third aspect, an embodiment of the present disclosure provides an electronic device, including a processor and a memory. The memory is configured to store at least one executable instruction, which causes the processor to perform the method for controlling the intelligent mobile apparatus described above.

The processor may be a CPU, or an application specific integrated circuit (ASIC), or one or more integrated circuits configured to implement the embodiments of the present disclosure. The one or more processors included in the computer device may be processors of the same type, such as one or more CPUs, or processors of different types, such as one or more CPUs and one or more ASICs.

The memory is configured to store programs. The memory may include a high-speed random-access memory (RAM), or a non-volatile memory, for example, at least one disk memory.

The computer-readable storage medium may be a read-only memory (ROM), a random-access memory (RAM), a CD-ROM, a magnetic tape, a floppy disk, an optical data storage apparatus, or the like.

In a fourth aspect, an embodiment of the present disclosure provides a storage medium storing a computer program instruction. When the computer program instructions is invoked and executed by a processor, the steps of the method for controlling the intelligent mobile apparatus described above are implemented.

The present disclosure has been described by means of the above embodiments. But, it should be understood that the above embodiments are merely for exemplary and illustrative purposes, and are not intended to limit the present disclosure to the scope of the embodiments described. Furthermore, those skilled in the art may understand that the present disclosure is not limited to the above embodiments, and more variations and modifications may be made according to the teachings of the present disclosure. These variations and modifications shall fall within the scope of protection claimed by the present disclosure. The scope of protection of the present disclosure is defined by the appended claims and equivalent scopes thereof.

What is claimed is:

1. A method for controlling an intelligent mobile apparatus, comprising:
acquiring, when the intelligent mobile apparatus is trapped, first ground medium attribute information of a trapping region, wherein the first ground medium attribute information comprises ground medium attribute information of the trapping region; and
controlling, if the first ground medium attribute information matches target ground medium attribute information, the intelligent mobile apparatus to leave the trapping region and re-enter the trapping region in a direction different from a direction in which the intelligent mobile apparatus enters the trapping region,
wherein the re-entering the trapping region in the direction different from the direction in which the intelligent mobile apparatus enters the trapping region comprises:
determining a target advancing direction and a target advancing distance of the intelligent mobile apparatus, wherein the target advancing direction is a direction that is different from the direction in which the intelligent mobile apparatus enters the trapping region and that points to the trapping region, and the target advancing distance is a distance in the target advancing direction between the intelligent mobile apparatus after escape and an edge of the trapping region; and
controlling, based on the target advancing distance, the intelligent mobile apparatus to move along the target advancing direction, such that the intelligent mobile apparatus re-enters the trapping region.

2. The method according to claim 1, wherein the controlling, based on the target advancing distance, the intelligent mobile apparatus to move along the target advancing direction, such that the intelligent mobile apparatus re-enters the trapping region, comprises:
controlling the intelligent mobile apparatus to travel along the target advancing direction by taking a position where the intelligent mobile apparatus escapes successfully as a starting point;
acquiring a first real-time distance traveled by the intelligent mobile apparatus in the target advancing direction and second ground medium attribute information, wherein the second ground medium attribute information comprises ground medium attribute information detected by the intelligent mobile apparatus in the target advancing direction; and
determining that the intelligent mobile apparatus has re-entered the trapping region if the first real-time distance is greater than or equal to the target advancing distance and the second ground medium attribute information matches the target ground medium attribute information.

3. The method according to claim 1, wherein the determining the target advancing direction and the target advancing distance of the intelligent mobile apparatus comprises:
acquiring the target advancing direction of the intelligent mobile apparatus by taking a position where the intelligent mobile apparatus escapes successfully as a starting point and deflecting the intelligent mobile apparatus clockwise or counterclockwise by a preset angle;
acquiring a reference distance, wherein the reference distance is a movement distance of the intelligent mobile apparatus from a trapping position to the position where the intelligent mobile apparatus escapes successfully; and
acquiring, based on the preset angle and the reference distance, the target advancing distance of the intelligent mobile apparatus.

4. The method according to claim 3, wherein the preset angle is not less than 30°.

5. The method according to claim 1, wherein the controlling the intelligent mobile apparatus to leave the trapping region comprises:
acquiring a preset retreating direction, wherein the preset retreating direction is opposite to the direction in which the intelligent mobile apparatus enters the trapping region; and
controlling the intelligent mobile apparatus to leave the trapping region along the preset retreating direction.

6. The method according to claim 5, further comprising: confirming that the intelligent mobile apparatus has left the trapping region, comprising:
acquiring a second real-time distance traveled by the intelligent mobile apparatus along the preset retreating direction; and
determining that the intelligent mobile apparatus has left the trapping region if the second real-time distance is greater than or equal to a preset retreating distance.

7. The method according to claim 5, further comprising: confirming that the intelligent mobile apparatus has left the trapping region, comprising: determining that the intelligent mobile apparatus has left the trapping region when current ground medium attribute information does not match the target ground medium attribute information.

8. The method according to claim 1, wherein after re-entering the trapping region in the direction different from the direction in which the intelligent mobile apparatus enters the trapping region, the method further comprises: controlling, after the intelligent mobile apparatus has traveled out of the trapping region, the intelligent mobile apparatus to continue traveling along the direction in which the intelligent mobile apparatus enters the trapping region.

9. An intelligent mobile apparatus comprising an environmental monitoring sensor and a controller, wherein:
the environmental monitoring sensor is configured to monitor ground medium attributes during movement of the intelligent mobile apparatus to acquire first ground medium attribute information, second ground medium attribute information, or current ground medium attribute information, wherein the first ground medium attribute information comprises ground medium attribute information of a trapping region, and the second ground medium attribute information comprises ground medium attribute information detected in a target advancing direction, wherein the target advancing direction is different from a direction in which the intelligent mobile apparatus enters the trapping region and points to the trapping region; and
the controller is configured to perform the method for controlling the intelligent mobile apparatus according to claim 1.

10. An electronic device, comprising:
at least one hardware processor; and
a memory storing at least one executable instruction that, when executed by the at least one hardware processor, directs the at least one hardware processor to perform a method for controlling an intelligent mobile apparatus, comprising:
acquiring, when the intelligent mobile apparatus is trapped, first ground medium attribute information of a trapping region, wherein the first ground medium attribute information comprises ground medium attribute information of the trapping region; and
controlling, if the first ground medium attribute information matches target ground medium attribute information, the intelligent mobile apparatus to leave the trapping region and re-enter the trapping region in a direction different from a direction in which the intelligent mobile apparatus enters the trapping region,
wherein the re-entering the trapping region in the direction different from the direction in which the intelligent mobile apparatus enters the trapping region comprises:
determining a target advancing direction and a target advancing distance of the intelligent mobile apparatus, wherein the target advancing direction is a direction that is different from the direction in which the intelligent mobile apparatus enters the trapping region and that points to the trapping region, and the target advancing distance is a distance in the target advancing direction between the intelligent mobile apparatus after escape and an edge of the trapping region; and
controlling, based on the target advancing distance, the intelligent mobile apparatus to move along the target advancing direction, such that the intelligent mobile apparatus re-enters the trapping region.

11. The electronic device according to claim 10, wherein the controlling, based on the target advancing distance, the intelligent mobile apparatus to move along the target advancing direction, such that the intelligent mobile apparatus re-enters the trapping region, comprises:
controlling the intelligent mobile apparatus to travel along the target advancing direction by taking a position where the intelligent mobile apparatus escapes successfully as a starting point;
acquiring a first real-time distance traveled by the intelligent mobile apparatus in the target advancing direction and second ground medium attribute information, wherein the second ground medium attribute information comprises ground medium attribute information detected by the intelligent mobile apparatus in the target advancing direction; and
determining that the intelligent mobile apparatus has re-entered the trapping region if the first real-time distance is greater than or equal to the target advancing distance and the second ground medium attribute information matches the target ground medium attribute information.

12. The electronic device according to claim 10, wherein the determining the target advancing direction and the target advancing distance of the intelligent mobile apparatus comprises:
acquiring the target advancing direction of the intelligent mobile apparatus by taking a position where the intelligent mobile apparatus escapes successfully as a starting point and deflecting the intelligent mobile apparatus clockwise or counterclockwise by a preset angle;
acquiring a reference distance, wherein the reference distance is a movement distance of the intelligent mobile apparatus from a trapping position to the position where the intelligent mobile apparatus escapes successfully; and
acquiring, based on the preset angle and the reference distance, the target advancing distance of the intelligent mobile apparatus.

13. The electronic device according to claim 12, wherein the preset angle is not less than 30°.

14. The electronic device according to claim 10, wherein the controlling the intelligent mobile apparatus to leave the trapping region comprises:

acquiring a preset retreating direction, wherein the preset retreating direction is opposite to the direction in which the intelligent mobile apparatus enters the trapping region; and controlling the intelligent mobile apparatus to leave the trapping region along the preset retreating direction.

15. The electronic device according to claim 14, wherein the method further comprises: confirming that the intelligent mobile apparatus has left the trapping region, comprising:

acquiring a second real-time distance traveled by the intelligent mobile apparatus along the preset retreating direction; and determining that the intelligent mobile apparatus has left the trapping region if the second real-time distance is greater than or equal to a preset retreating distance.

16. The electronic device according to claim 14, wherein the method further comprises: confirming that the intelligent mobile apparatus has left the trapping region, comprising: determining that the intelligent mobile apparatus has left the trapping region when current ground medium attribute information does not match the target ground medium attribute information.

17. The electronic device according to claim 10, wherein after re-entering the trapping region in the direction different from the direction in which the intelligent mobile apparatus enters the trapping region, the method further comprises: controlling, after the intelligent mobile apparatus has traveled out of the trapping region, the intelligent mobile apparatus to continue traveling along the direction in which the intelligent mobile apparatus enters the trapping region.

* * * * *